(12) United States Patent
Otting et al.

(10) Patent No.: US 6,735,946 B1
(45) Date of Patent: May 18, 2004

(54) DIRECT ILLUMINATION FREE PISTON STIRLING ENGINE SOLAR CAVITY

(75) Inventors: William D. Otting, Thousand Oaks, CA (US); Patriok E. Frye, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/324,699

(22) Filed: Dec. 20, 2002

(51) Int. Cl.[7] ................................................ F03G 6/00
(52) U.S. Cl. ................................. 60/641.11; 60/641.15
(58) Field of Search ........................... 60/641.8, 641.11, 60/641.15

(56) References Cited

U.S. PATENT DOCUMENTS

| | | | | |
|---|---|---|---|---|
| 5,113,659 A | * | 5/1992 | Baker et al. ................ | 60/641.8 |
| 5,459,996 A | * | 10/1995 | Malloy et al. ............. | 60/200.1 |
| 6,065,284 A | * | 5/2000 | Horner et al. ............. | 60/203.1 |

* cited by examiner

*Primary Examiner*—Hoang Nguyen
(74) *Attorney, Agent, or Firm*—Harness Dickey & Pierce P.L.C.

(57) ABSTRACT

A solar power system is provided for converting sunlight into electricity. The solar power system utilizes a mirror to focus the sunlight into a cavity of an absorption chamber. The cavity includes heat conducting shoes which absorb the solar energy reflected by the mirror and conduct the thermal energy to a plurality of a free piston Stirling converters mounted to the absorption chamber. The Stirling converter converts the thermal energy into electrical energy. The solar power system of the present invention reduces costs of typical solar power systems by using a plurality of free piston Stirling converters of a size small enough to allow the use of a simple monolithic heater head which is simple and inexpensive to fabricate and does not require complex external tubular heat exchangers. The free piston Stirling converter does not require a crankshaft or contacting seals and thereby is reliable and low maintenance.

20 Claims, 2 Drawing Sheets

DIRECT ILLUMINATION FREE PISTON STIRLING ENGINE SOLAR CAVITY

FIELD OF THE INVENTION

The present invention relates to the field of electrical energy generation through solar power collection, and more particularly to solar power generation using free piston Stirling engines implemented in a directly illuminated solar cavity.

BACKGROUND OF THE INVENTION

The desire to decrease and ultimately eliminate dependence on fossil fuels has stimulated research into clean and renewable ways to produce electricity for the global marketplace. Solar power has become a viable option because it is a clean form of energy production and there is a potentially limitless supply of solar radiation. To that end, it is estimated the solar energy flux from the sun is approximately 2.7 megawatt-hours per square meter per year in certain advantageous areas of the world. With this tremendous amount of free and clean energy available, and the desire to reduce dependence on fossil fuels, solar power production is now, more than ever, being reviewed as an important means to help meet the energy consumption demands in various parts of the world.

Technological innovations and improvements have helped to make terrestrial solar power generation a feasible means for large scale power production. More specifically, the reduction in the magnitude of capital investment required and the reduction in recurring operation and maintenance costs allow solar power generation to compete with other forms of terrestrial power generation. Further, the scalability of solar power plants has the potential to enable smaller facilities to be constructed, with production capacity on the order of ten kilowatts, for communities with smaller demands and larger facilities capable of producing one hundred megawatts or more for large metropolitan areas with higher energy demands.

To address the above demand for solar power systems many configurations have been designed and implemented. One such implementation is a concentrated solar power system that collects solar energy and concentrates that energy onto an absorber. The thermal energy from the absorber is then used to drive a conversion engine. Typical systems employ kinematic Stirling engines. Kinematic Stirling engines, however, utilize a crankshaft to extract power from the engine and turn an external generator to produce electricity. This requires a contacting lubricated seal on the crankshaft to seal and contain the high pressure working gas within the engine, resulting in a system with low reliability and high overall maintenance costs. The high recurring cost associated with the use of kinematic Stirling engines makes the present day solar power generation systems that require their use economically unattractive.

Accordingly, a need exists for a solar power generation system utilizing a reliable and cost effective mechanism for converting solar power into electricity.

SUMMARY OF THE INVENTION

The present invention provides a solar power system for converting sunlight (i.e., solar energy) into electrical energy. The solar power system utilizes at least one mirror to focus the sunlight into a cavity. The cavity is formed by a plurality of heat collectors, which function to absorb the incoming solar energy and conduct the energy to a plurality of free piston Stirling converters. The free piston Stirling converters convert the thermal energy into electrical energy. The solar power system of the present invention reduces the capital and recurring costs of typical solar power systems by using multiple free piston Stirling converters as the energy conversion device. In particular, free piston Stirling converters of a small size (less than 3 kW electric) are very simple by design and inexpensive to massproduce because the required heat exchangers can be incorporated within a simple monolithic heater head. Because surface area does not scale proportional to volume, larger scale free piston Stirling converters require heat exchangers, typically multiple tube heat exchangers, external to the core vessel, to provide the required heat transfer surface area resulting in a device that is complex and expensive to fabricate. Therefore, a system employing multiple Stirling converters of a smaller size that utilize a simple monolithic heater head type is more cost effective. Furthermore, the free piston Stirling converter consists of a Stirling engine and linear alternator all contained within a hermetic vessel. There is no crankshaft required to drive an external generator as with a kinematic Stirling engine. The free piston Stirling converter uses noncontacting clearance seals within the device, so there are no contacting parts to wear, resulting in very high reliability and low maintenance. Thus, the use of multiple free piston Stirling converters greatly reduces the overall capital cost and maintenance costs when compared to current systems employing large kinematic Stirling engines.

Further areas of applicability of the present invention will become apparent from the detailed description provided hereinafter. It should be understood that the detailed description and specific examples are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
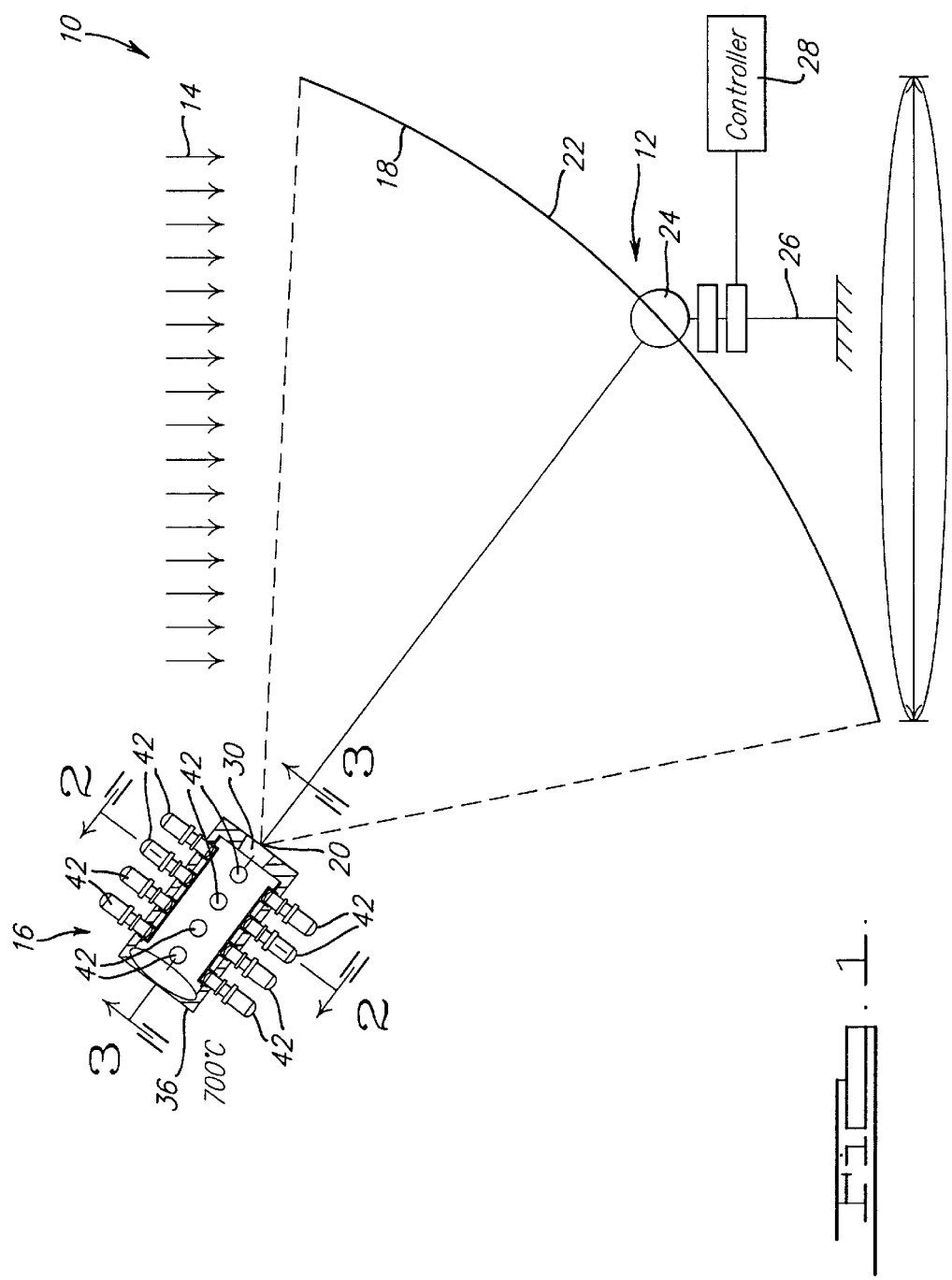
FIG. 1 is a schematic of a solar power system according to a preferred embodiment of the present invention.

With reference to FIG. 1, a solar power system 10 in accordance with a preferred embodiment of the present invention is shown. The solar power system 10 includes collection system 12. The collection system 12 gathers sunlight 14 and transmits the solar energy from the sunlight 14 to a conversion system 16. The conversion system 16 uses the thermal energy from the collection system 12 to create electricity.

The collection system 12 includes a mirror 18. In one preferred form, the mirror 18 is generally dish-shaped and parabolic. However, virtually any shape of mirror(s) could be employed provided it is capable of focusing the sunlight onto a predefined target area. The sunlight 14 strikes the mirror 18 and is reflected to a focus 20 of the mirror 18. The mirror 18 is coupled to a support structure 22 that supports the mirror 18. The support structure 22 is further coupled to a pivot assembly 24. The pivot assembly 24 is rotatably coupled to a base 26. The base 26 is affixed to a ground surface as shown. The pivot assembly 24 enables the mirror 18 to be adjusted to track the sun as the sun travels across the sky. Specifically, the pivot assembly 24 provides two axes of rotation (i.e., vertical and horizontal) for the mirror 18, as known in the art. A controller 28 coupled to the collection system 12 controls the pivot assembly 24 so that it causes the mirror 18 to track the sun. More specifically, the controller 28 drives a motor (not shown) associated with the pivot assembly 24 to pivot the mirror 18 as needed.

Figure 2:
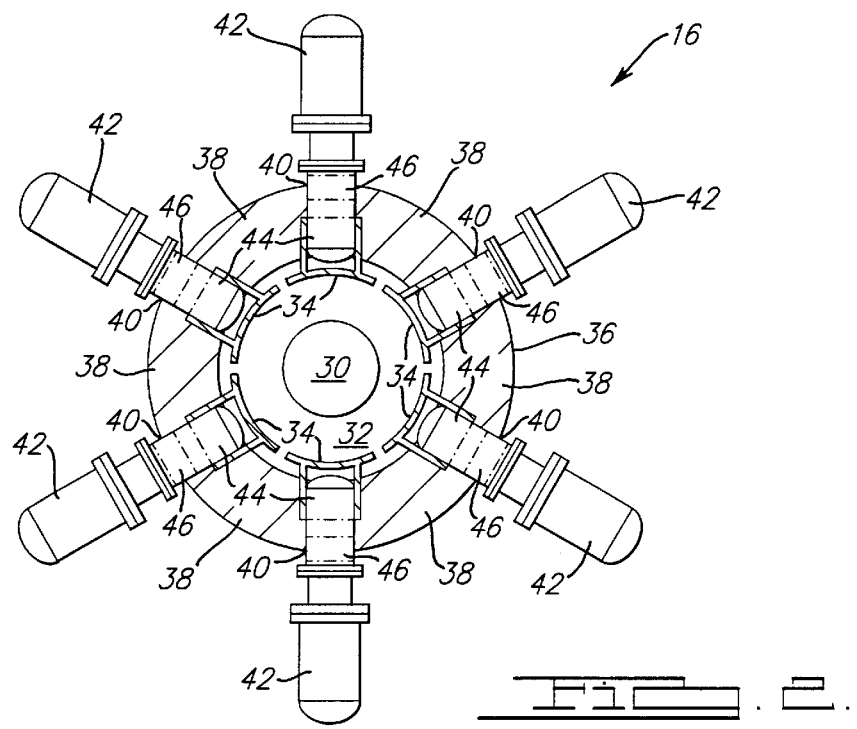
FIG. 2 is a is a sectional view of the solar power system of FIG. 1 taken along section line 2—2.

The sunlight 14 is reflected from the collection system 12 to the conversion system 16 as shown in FIG. 2. The sunlight 14 enters the conversion system 16 through an aperture 30 therein. The reflected sunlight 14 passes through the aperture 30 into a cylindrical receiving cavity 32 defined by a plurality of hot shoes 34. In this embodiment, the receiving cavity 32 includes six hot shoes 34 arranged into a circle, with four circles defining the length of the cavity as shown in FIG. 1. However, it will be appreciated that a greater or lesser number of hot shoes 34 could also be employed as well as a different number of circles. The hot shoes 34 can be made from a thermally conductive material, such as, but not limited to, nickel, graphite or copper.

Referring back to FIG. 2, the hot shoes 34 are supported and enclosed by a cylindrical structure 36. The cylindrical structure 36 is lined with an insulation 38, for example microtherm or bulk insulation, to reduce potential heat loss. The cylindrical structure 36 also defines a plurality of openings 40 through which portions of a plurality of conversion engines 42 extend. The conversion engines 42 are coupled to the hot shoes 34 for receipt of thermal energy. Specifically, each hot shoe 34 conducts the thermal energy received from the collection system 12 to a monolithic heater head 44 on the conversion engine 42. The thermal energy drives the conversion engines 42 to produce electricity. In this embodiment, the conversion engines 42 are free-piston Stirling converters. The free-piston Stirling converter 42 is highly reliable while having a relatively small size and lower cost than other available energy conversion engines. The conversion engine 42 is cooled by a cooling system 46. The cooling system 46 circulates coolant to and from a radiator system (not shown) which dissipates the waste heat to the environment via convection and radiation.

Figure 3:
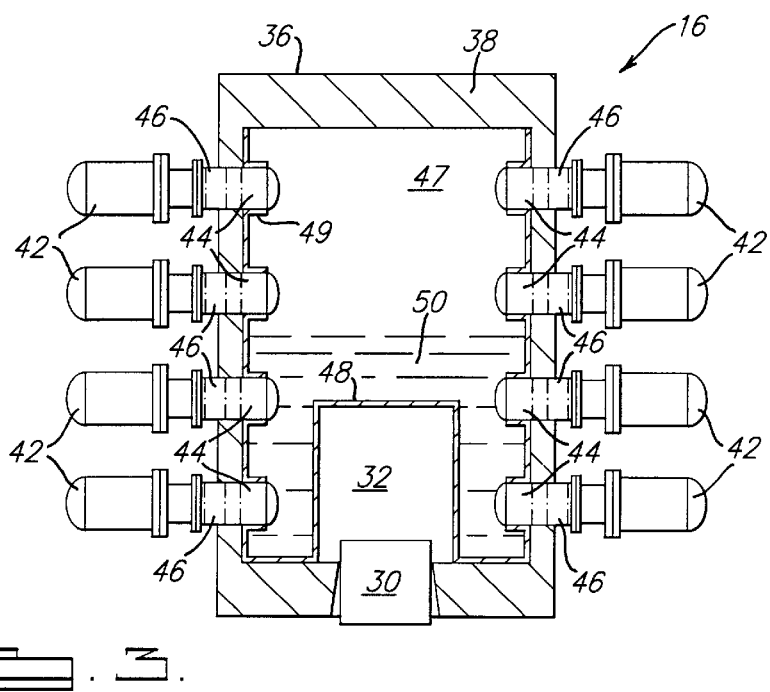
FIG. 3 is a is a view of an alternative embodiment of the solar power system of FIG. 1 along directional line 3—3.

An alternative embodiment of the conversion system 16 is shown in FIG. 3. In this embodiment, the hot shoes 34 are replaced by a heat pipe heat transport system. For purposes of clarity, when available, the same reference numbers will be used herein. The reflected sunlight 14 passes through the aperture 30 into a receiving cavity 32.

During operation, the sunlight 14 strikes the mirror 18 of the collector system 12. The mirror 18 concentrates the sunlight 14 to the focus 20, which is essentially at the aperture 30. The sunlight 14 passes through the aperture 30 into the receiving cavity 32. The solar energy generated by the reflected sunlight 14 is absorbed by the cavity wall 32. The back side of the hot cavity wall 32 is covered with the heat pipe evaporator wick material 48. Contained within the evaporator wick material 48 is the heat pipe working fluid 50, typically sodium or potassium. The heat absorbed on the cavity wall 32 will increase the temperature of the cavity wall 32 and, at a point, cause the heat pipe working fluid 50 to evaporate, effectively cooling the cavity wall 32. The resulting vapor is transported to the heat pipe vapor space 47. The vapor in the vapor space 47 will condense on the relatively cold condenser 49 where heat is being removed via the Stirling converters 42. The heat deposited via condensation of the working fluid 50 effectively transports the absorbed heat energy from the cavity wall 32 to the heat input zone on the Stirling converter 44. The Stirling converters 44 convert the thermal energy to electrical energy. The condensed working fluid 50 is returned to the evaporator 48 using a combination of gravity and the evaporator wick material 48 within the heat pipe. This approach provides even distribution of heat to the Stirling converters 44.

The solar power system 10 provides a cost effective method for producing electricity from solar energy. In particular, the use of multiple free piston Stirling converters 42 greatly reduces the overall cost and maintenance costs when compared to current systems since the free piston stirling conversion engine 42 does not require a crankshaft or contacting. seals. Reliability is improved and capital costs are reduced by the use of a plurality of smaller Stirling engines 42 of the type using a simple monolithic heater head, since large Stirling engines require large and complex external tubular heat exchangers that are difficult and expensive to fabricate. Furthermore, the arrangement of the hot shoes 34 to form the receiving cavity 32 results in a simple, highly reliable receiving cavity 32 while providing efficient energy transfer to the conversion engine 42.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solar power system wherein sunlight is converted to electrical energy comprising:

a housing defining a cavity;

at least one mirror to focus the sunlight into said cavity;

a plurality of heat conducting shoes within said housing for absorption of the solar energy reflected by said at least one mirror; and an engine that converts thermal energy to electrical energy;

wherein said plurality of shoes are conductively coupled to said engine.

2. The system of claim 1, wherein said at least one mirror includes a parabolic-dish-shaped mirror that focuses said sunlight to a focus point.

3. The system of claim 1, wherein said shoes are constructed of a thermally conductive material selected from the group comprising one of copper, nickel and graphite.

4. The system of claim 1 wherein said engine includes a free piston Stirling converter.

5. The system of claim 1 wherein said hot shoes are surrounded by a layer of insulation for protecting against heat loss.

6. The system of claim 1 further including a control system for aligning said at least one mirror with the sunlight.

7. The system of claim 6 wherein said control system includes a controller communicating with a pivot assembly coupled to said at least one mirror for moving said at least one mirror with respect to the sunlight.

8. A solar power system wherein sunlight is converted to electrical energy comprising:

at least one mirror to focus the sunlight;

an absorption chamber defining a cavity for receipt of the solar energy reflected by said at least one mirror a plurality of heat conducting shoes lining an interior of said cavity for conduction of the received solar energy;

an engine in thermal communication with at least one of said heat conducting shoes that converts thermal energy to electrical energy.

9. The system of claim 8, wherein said absorption chamber is lined with a heat pipe.

10. The system of claim 9, wherein said heat pipe has a volume contains a working fluid.

11. The system of claim 10, wherein said working fluid includes at least one of lithium, sodium, and potassium.

12. The system of claim 8, wherein said at least one mirror includes a parabolic-dish-shaped mirror that focuses said sunlight to a focus point.

13. The system of claim 8, wherein said shoes are constructed of a thermally conductive material selected from the group of copper, nickel and graphite.

14. The system of claim 8, wherein said engine includes a free piston Stirling converter.

15. The system of claim 8, wherein said absorptive chamber is surrounded by a layer of insulation for protecting against heat loss.

16. The system of claim 8, further including a control system for aligning said at least one mirror with the sunlight.

17. The system of claim 16, wherein said control system includes a controller communicating with a pivot assembly coupled to said at least one mirror for moving said at least one mirror with respect to the sunlight.

18. A solar power system wherein sunlight is converted to electrical energy comprising:

an absorption chamber having a cavity;

at least one mirror coupled to a pivot assembly which focuses the sunlight into said cavity;

a controller in communication with said pivot assembly to position said mirror with respect to the sunlight;

a plurality of heat conducting shoes operably associated with said cavity for absorption of the solar energy reflected by said at least one mirror; and an engine thermally conductively associated with at least one of said heat shoes that converts thermal energy to electrical energy.

19. The system of claim 18, wherein said engine is a free piston Stirling converter.

20. The system of claim 18, wherein said at least one mirror includes a parabolic-dish-shaped mirror that focuses said sunlight to a focus point.

* * * * *

UNITED STATES PATENT AND TRADEMARK OFFICE
CERTIFICATE OF CORRECTION

PATENT NO.    : 6,735,946 B1
DATED         : May 18, 2004
INVENTOR(S)   : Otting et al.

It is certified that error appears in the above-identified patent and that said Letters Patent is hereby corrected as shown below:

<u>Title page,</u>
Item [75], Inventors, co-inventors's name should be -- Patrick E. Frye --.

<u>Column 5,</u>
Line 6, after "volume" insert -- that --.

Signed and Sealed this

Twelfth Day of October, 2004

JON W. DUDAS
*Director of the United States Patent and Trademark Office*